United States Patent
Kalos et al.

(10) Patent No.: US 7,617,373 B2
(45) Date of Patent: Nov. 10, 2009

(54) APPARATUS, SYSTEM, AND METHOD FOR PRESENTING A STORAGE VOLUME AS A VIRTUAL VOLUME

(75) Inventors: Matthew Joseph Kalos, Tucson, AZ (US); Robert Akira Kubo, Tucson, AZ (US); Richard Anthony Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 11/419,957

(22) Filed: May 23, 2006

(65) Prior Publication Data

US 2007/0277015 A1 Nov. 29, 2007

(51) Int. Cl.
*G06F 13/00* (2006.01)
(52) U.S. Cl. .................... 711/170; 711/112
(58) Field of Classification Search .......... 711/170, 711/112
See application file for complete search history.

(56) References Cited

U.S. PATENT DOCUMENTS

| | | | |
|---|---|---|---|
| 6,212,531 B1 | 4/2001 | Blea et al. | 707/204 |
| 6,584,499 B1 * | 6/2003 | Jantz et al. | 709/220 |
| 6,779,095 B2 * | 8/2004 | Selkirk et al. | 711/165 |
| 6,829,688 B2 | 12/2004 | Grubbs et al. | 711/162 |
| 6,839,819 B2 | 1/2005 | Martin | 711/162 |
| 7,356,679 B1 * | 4/2008 | Le et al. | 713/1 |
| 2002/0103889 A1 | 8/2002 | Markson et al. | 709/223 |
| 2003/0005248 A1 | 1/2003 | Selkirk et al. | 711/165 |
| 2003/0188114 A1 * | 10/2003 | Lubbers et al. | 711/162 |
| 2004/0030822 A1 | 2/2004 | Rajan et al. | 711/4 |
| 2004/0268070 A1 | 12/2004 | Hasegawa | 711/162 |
| 2005/0027938 A1 | 2/2005 | Burkey | 711/114 |
| 2005/0055603 A1 | 3/2005 | Soran et al. | 714/7 |
| 2005/0114595 A1 | 5/2005 | Karr et al. | 711/114 |
| 2005/0125593 A1 | 6/2005 | Karpoff et al. | 711/4 |
| 2007/0260831 A1 * | 11/2007 | Michael et al. | 711/162 |

\* cited by examiner

*Primary Examiner*—Matt Kim
*Assistant Examiner*—John P Fishburn
(74) *Attorney, Agent, or Firm*—Kunzler & McKenzie (57) ABSTRACT

An apparatus, system, and method are disclosed for presenting a storage volume as a virtual volume. An attribute module determines a primary volume physical attribute of a primary volume. A presentation module presents the primary volume physical attribute to a host as a target volume virtual attribute of a target volume. A translation module translates communications between a host and the target volume. In one embodiment, a copy module creates a point-in-time copy of the primary volume on the target volume.

20 Claims, 7 Drawing Sheets

APPARATUS, SYSTEM, AND METHOD FOR PRESENTING A STORAGE VOLUME AS A VIRTUAL VOLUME

BACKGROUND OF THE INVENTION

1. Field of the Invention

This invention relates to virtual volumes and more particularly relates to presenting virtual attributes to a host.

2. Description of the Related Art

Data processing systems such a computer workstations, servers, mainframe computers, and the like typically store data on one or more storage devices. In one embodiment, a storage controller manages the storage devices. For example, the storage controller may initialize the storage devices, perform maintenance operations on the storage devices, and write data to and read data from the storage devices. In a certain embodiment, a storage server may manage communications between a data processing system and a storage controller. The storage server, storage controllers, and storage devices may be embodied in a storage subsystem.

A storage device may be a hard disk drive, an optical storage drive, a magnetic tape drive, or the like. The storage device may be organized as one or more physical volumes. Each physical volume may have a number of distinguishing physical attributes such as data storage capacity, a number of cylinders, a number of tracks on a cylinder, a number of sectors on a track, a data capacity of a track, a data capacity of a data block, and the like.

The storage device often stores large amounts of valuable data. To protect against loss of the data, an administrator of the data processing system will typically direct a software process to back up the storage device by copying data from the storage device to another storage device. In one embodiment, the software process may make a snapshot copy. The snapshot copy or point-in-time copy is a copy of a specified instance of the data, such as the instance of the data at a specified time.

The software process that creates the snapshot copy typically writes metadata and data from a primary physical volume to a target physical volume. The primary physical volume and target physical volumes are referred to herein as the primary volume and the target volume respectively. The metadata may describe the data, including the source of the data and the time the snapshot was created. In one embodiment, the metadata is written to the beginning addresses of the target volume. The software process may write the data after the metadata to subsequent target volume addresses. Alternatively, the software process writes metadata to the target volume at addresses subsequent to the addresses of the data.

In addition, the software process may write data from the primary volume to the target volume when the primary volume is idle to minimize the impact of the backup operation on primary volume performance. The software process may also delay copying a data block from the primary volume to the target volume until just before the data block on the primary volume is overwritten.

Thus the backup software process may be configured to write data blocks from the primary volume to predetermined addresses in the target volume. As a result, the backup software process is often designed to only backup data to a target volume with substantially similar physical attributes to the primary volume to assure that there is sufficient space for all data blocks and metadata when copied to the target volume.

Unfortunately, limiting target volumes to the physical attributes of the primary volume constrains the flexibility of the data processing system administrator in configuring the storage subsystem. For example, the administrator may include only physical volumes of a specified capacity in the storage subsystem to assure that sufficient target volumes are available to backup each primary volume. This may prevent the administrator from adding larger capacity, more cost efficient storage devices over time.

From the foregoing discussion, it should be apparent that a need exists for an apparatus, system, and method that present a virtual physical volume attribute. Beneficially, such an apparatus, system, and method would allow a storage subsystem to employ storage devices with a plurality of physical attributes.

SUMMARY OF THE INVENTION

The present invention has been developed in response to the present state of the art, and in particular, in response to the problems and needs in the art that have not yet been fully solved by currently available target volume designation methods. Accordingly, the present invention has been developed to provide an apparatus, system, and method for presenting a storage volume as a virtual volume that overcome many or all of the above-discussed shortcomings in the art.

The apparatus to present a virtual volume is provided with a plurality of modules configured to functionally execute the steps of determining a primary volume physical attribute, presenting the primary volume physical attribute to a host, and translating communications between the host and a target volume. These modules in the described embodiments include an attribute module, and a presentation module. In addition, the apparatus may include a translation module.

The attribute module determines a primary volume physical attribute. The attribute may be a volume size of a primary volume. For example, the primary volume physical attribute may be that the primary volume's volume size is one hundred gigabytes (100 GB). Alternatively, the primary volume physical attribute may be a data block size, a number of tracks per cylinder, and a number of sectors per track. In addition, the primary volume physical attribute may be a logical attribute such as a model number.

The presentation module presents the primary volume physical attribute to a host as a target volume virtual attribute of a target volume. Thus the host believes that the target volume has the primary volume physical attribute, regardless of the physical attribute of the target volume. For example, the presentation module may present that the target volume has a one hundred gigabyte (100 GB) volume size, when the target volume actually has a two hundred gigabyte (200 GB) volume size.

In one embodiment, the translation module translates communications between the host and the target volume so that communications to and from the host are based on the target volume virtual attribute, which is equivalent to the primary volume physical attribute. In addition, communications to and from the target volume are based on a target volume physical attribute of the target volume. The apparatus allows a target volume with a physical attribute that is different from the primary volume physical attribute to be employed by a process that requires the target volume to have the primary volume physical attribute.

A system of the present invention is also disclosed to present a virtual volume. The system may be embodied in a storage subsystem. In particular, the system, in one embodiment, includes a primary volume, a target volume, and a storage controller. The system may also include a host. The storage controller may store data in the primary and the target volume for the host.

The primary volume and the target volume store and retrieve data. The storage controller manages the primary volume and the target volume. In one embodiment, the system includes a plurality of storage controllers each managing one or more volumes. In addition, the storage controller may execute one or more software processes that embody an attribute module, selection module, presentation module, and translation module.

The attribute module determines a primary volume physical attribute of the primary volume. In one embodiment, the selection module selects the target volume. The selection module may select the target volume if the target volume is compatible with the primary volume physical attribute. The presentation module presents the primary volume physical attribute to a host as a target volume virtual attribute of the selected target volume. The translation module translates communications between the host and the selected target volume. The system presents the target volume to the host as having the physical attribute of the primary volume so that the target volume may be used for functions that stipulate physical equivalence between the primary volume and the target volume.

A method of the present invention is also disclosed for presenting a virtual volume. The method in the disclosed embodiments substantially includes the steps to carry out the functions presented above with respect to the operation of the described apparatus and system. In one embodiment, the method includes determining a primary volume physical attribute, presenting the primary volume physical attribute to a host, and translating communications between the host and a target volume.

An attribute module determines a primary volume physical attribute of a primary volume. A presentation module presents the primary volume physical attribute to a host as a target volume virtual attribute of a target volume. A translation module translates communications between a host and the target volume. In one embodiment, a copy module creates a point-in-time copy of the primary volume on the target volume. The method allows target volumes of various physical attributes to support the primary volume and primary volume-related functions.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention presents a primary volume physical attribute as a target volume virtual attribute to a host, allowing the host to utilize a target volume as though the target volume had the primary volume physical attribute. In addition, the embodiment of the present invention may support employing the target volume for a point-in-time copy of the primary volume wherein the host stipulates a physically equivalent target volume. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
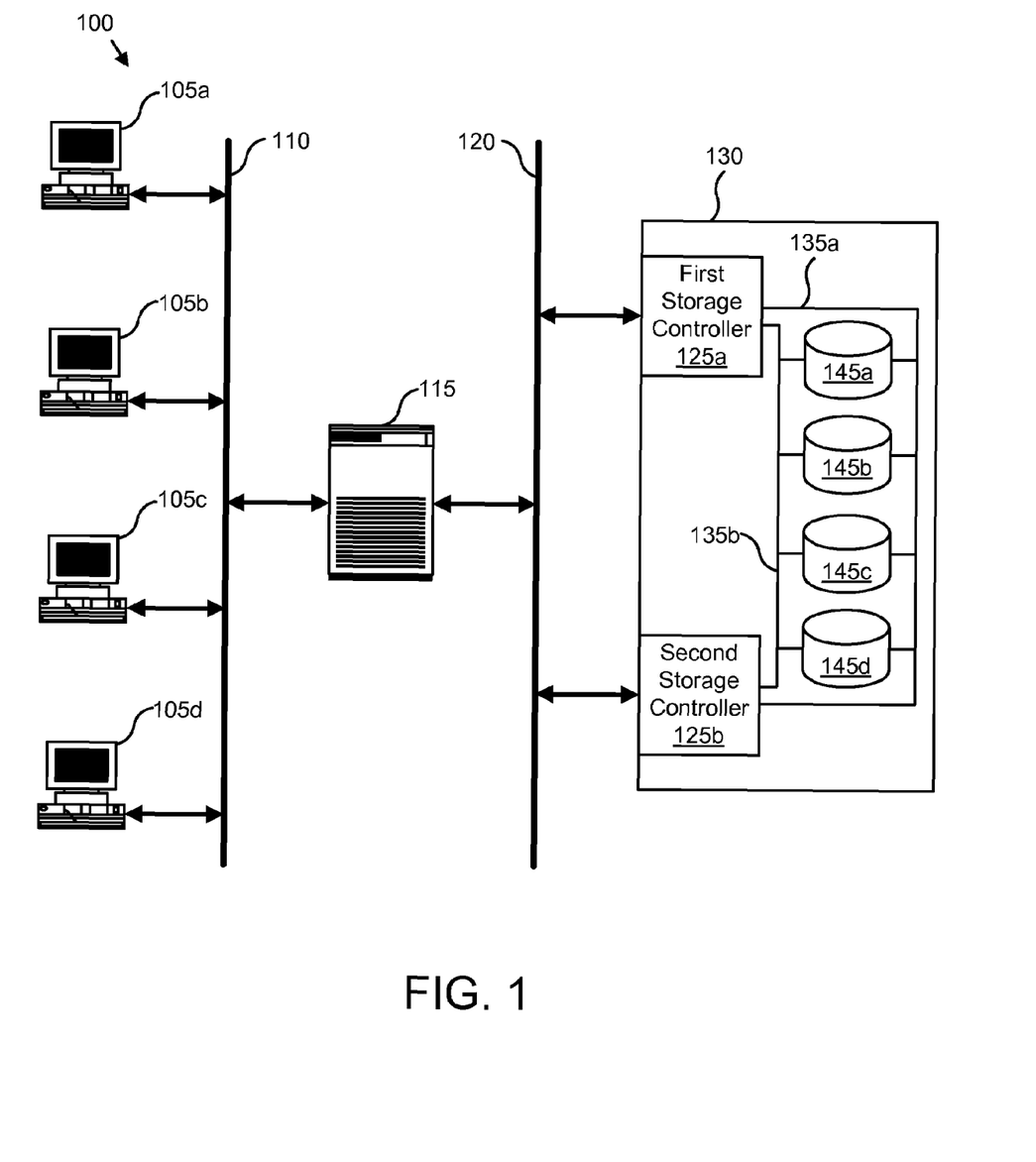
FIG. 1 is a schematic block diagram illustrating one embodiment of a data processing system in accordance with the present invention.

FIG. 1 is a schematic block diagram illustrating one embodiment of a data processing system 100 in accordance with the present invention. The system 100 includes one or more hosts 105, a network 110, a storage server 115, a storage network 120, and a storage subsystem 130. As depicted, the storage subsystem 130 includes one or more storage controllers 125, one or more communication channels 135, and one or more storage devices 145.

The storage subsystem 130 stores and retrieves data for the hosts 105. The hosts 105 communicate with the storage sever 115 over the network 110. The network 110 may be a local area network, the Internet, storage area network, or the like. The storage server 115 communicates with the storage subsystem over the storage network 120. The storage network 120 may be a token ring network, an Ethernet network, storage area network, or the like.

The storage controllers 125 manage the storage devices 145 of the storage subsystem 130. For example, the storage controllers 125 may initialize a storage device 145, logically partition the storage device 145, and perform maintenance functions on the storage device 145 as is well known by those skilled in the art. In addition, a host 105 may write data to a storage device 145 through a storage controller 125 and read data from a storage device 145 through a storage controller 125. The storage controllers 125 communicate with the storage devices 145 over the communication channels 135. The communication channels 135 may employ a small computer system interface ("SCSI") connection, a Fibre Channel connection, or the like.

The storage devices 145 may include hard disk drives, optical storage devices, or the like. For example, a storage device 145 may include one or more hard disk drive. In some embodiments, the storage controller 125 may form a Redundant Array of Independent Disks (RAID) array utilizing two or more storage devices 145, which represents a storage capacity in some aggregate form. The storage capacity of the RAID array may be subdivided into elements or logical volumes, each element or logical volume will have associated with it physical attributes. The storage controller 125 manages and presents the storage capacity of a logical volume to the host computers 105, substantially the same as it would a physical hard disk drive element. A hard disk drive or a logical volume may comprise a physical volume. Each physical volume has one or more physical attributes. Physical attributes may include a volume size, a data block size, a number of tracks per cylinder, and a number of sectors per track as is well known to those skilled in the art. In a prophetic example, a volume size of a physical volume may be three hundred gigabytes (300 GB).

Figure 2:
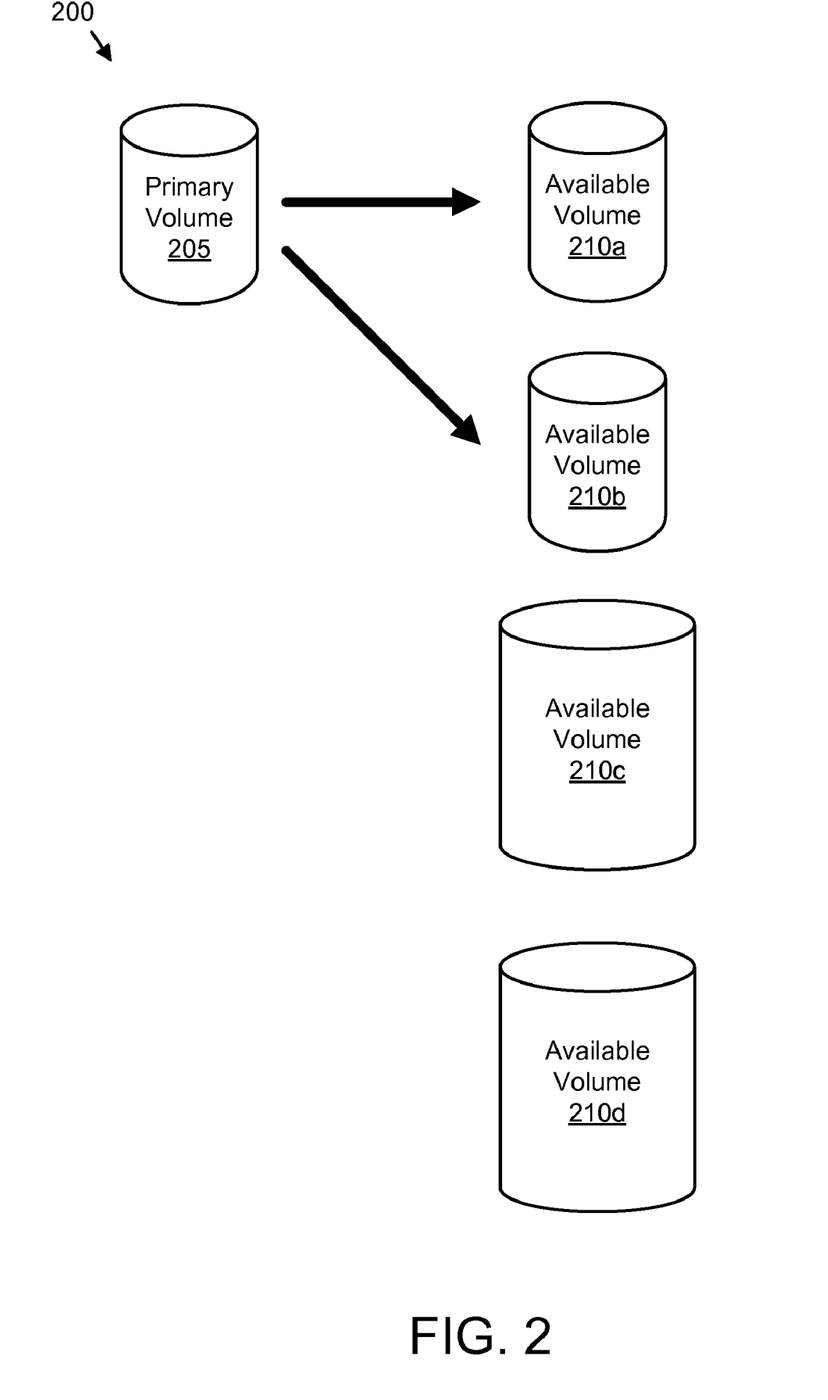
FIG. 2 is a schematic block diagram illustrating one embodiment of data volumes in accordance with the present invention.

FIG. 2 is a schematic block diagram illustrating one embodiment of data volumes 200 in accordance with the present invention. The volumes 200 are physical volumes of the storage devices 145 of FIG. 1. In addition, the description of the volumes 200 refers to elements of FIG. 1, like numbers referring to like elements. A plurality of volumes 205, 210 are depicted. In addition, the depicted size of each volume 205, 210 is roughly proportional to the volume size or storage capacity of each volume 205, 210.

In one prophetic example, a host 105 may store data on a primary volume 205. In addition, the host 145 may be directed by an administrator and/or user to make a point-in-time copy of the primary volume 205. The host 105 and/or storage controller 125 may select an available volume 210 from a plurality of available volumes 210 to store the point-in-time copy.

The point-in-time copy may be made over an extended period of time. As a result, the host 105 and/or the storage controller 125 may copy data blocks of the primary volume 205 to the available volume 210 in a non-sequential order until all data blocks are copied. The host 105 may direct that only available volumes 210 with the same physical attributes as the primary volume 205 be used for the point-in-time copy to assure that each data block of the primary volume 205 may be copied to a corresponding address in the available volume 210. The available volume 210 that is selected for storing a point-in-time copy is referred to herein as a target volume. As depicted in FIG. 2, only a first and second available volume 210a, 210b may be selected as the target volume as only the first and second available volumes 210a, 210b have the same volume size as the primary volume 205.

Unfortunately, requiring that each available volume 210 that is considered for use as a target volume have the physical attributes of the primary volume 205 restricts the options of the administrator when providing storage devices 145 for the storage subsystem 125. For example, some administrators have restricted storage devices 145 to one volume size to assure that all available volumes 210 could be used as target volumes. Yet restricting the allowable storage devices 145 may increase the cost and reduce the options for storing data in the storage subsystem 130.

The embodiment of the present invention presents a physical attribute of the primary volume 205 to a host 105 as a virtual attribute of a target volume, allowing the host 105 to employ the target volume for processes requiring an equivalent physical attribute even when the physical attributes of the target volume differ from the primary volume 205 as will be discussed hereafter. Thus the embodiment of the present invention supports including a plurality of storage device types with a plurality of physical volume types in a storage subsystem 130 while maintaining a large pool of available volumes 210 for storing copies of primary volumes 205.

Figure 3:
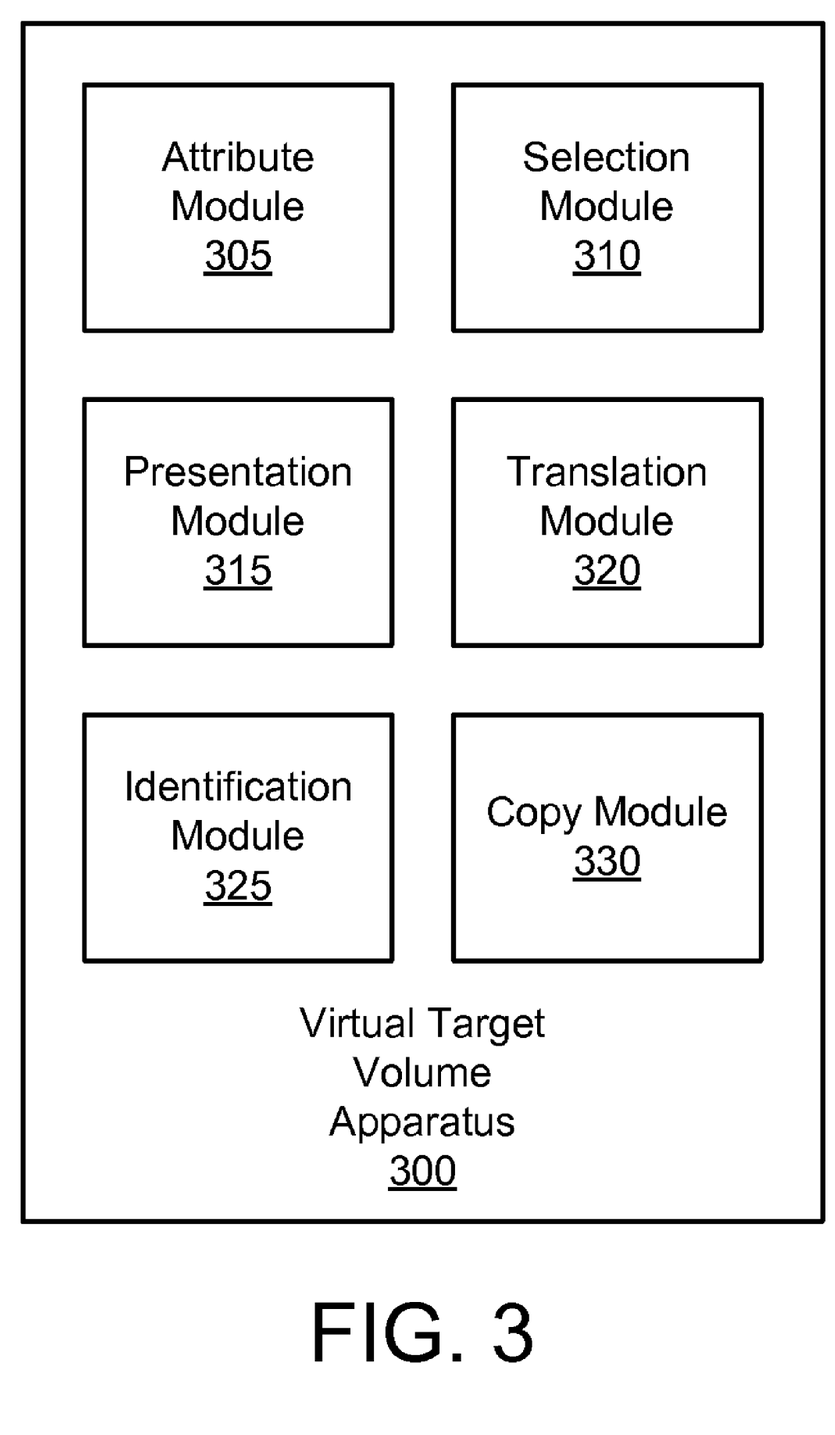
FIG. 3 is a schematic block diagram illustrating one embodiment of a virtual target volume apparatus of the present invention.

FIG. 3 is a schematic block diagram illustrating one embodiment of a virtual target volume apparatus 300 of the present invention. The apparatus 300 includes an attribute module 305, selection module 310, presentation module 315, translation module 320, identification module 325, and copy module 330. The description of the apparatus 300 refers to elements of FIGS. 1 and 2, like numbers referring to like elements.

The attribute module 305 determines a physical attribute of a primary volume 205 as will be described hereafter. The physical attribute may be a volume size of the primary volume 205. In a prophetic example, the primary volume physical attribute may be that the primary volume's volume size is one hundred gigabytes (100 GB). Alternatively, the primary volume physical attribute may be a data block size, a number of tracks per cylinder, and a number of sectors per track. In addition, the primary volume physical attribute may be a logical attribute such as a model number. In another prophetic example, the primary volume physical attribute may have a track size of fifty-six kilobytes (56 KB).

In one embodiment, the selection module 310 selects the target volume if the target volume is compatible with the primary volume physical attribute as will be described hereafter. In one prophetic example, the selection module 310 may only select the target volume from available volumes 210 with a volume size that is greater than or equal to the volume size of the primary volume 205.

The presentation module 315 presents the primary volume physical attribute to a host 105 as a target volume virtual attribute of the target volume as will be discussed hereafter. By presenting the primary volume physical attribute as the virtual attribute of the target volume, the host 105 believes that the target volume has the primary volume physical attribute, regardless of the physical attribute of the target volume. Thus an available volume 210 with a volume size greater than the volume size of the primary volume 205 may be selected as the target volume even if the host 105 is configured to employ only available volumes 210 with a volume size that is equivalent to the volume size of the primary volume 205.

In one embodiment, the translation module 320 translates communications between the host 105 and the target volume as will be discussed hereafter. In one prophetic example, communications to and from the host 105 may be based on a target volume track size of forty-eight kilobytes (48 KB) while communications to and from the target volume may be based on the target volume track size of fifty-six kilobytes (56 KB).

In one embodiment, the identification module 325 marks one or more available volumes 210 as virtual volume enabled. The identification module 325 may mark an available volume 210 as virtual volume enabled if the available volume 210 conforms to a specified physical attribute. In other embodiments, the identification module 325 may mark an available volume 210 as virtual volume enabled, such that storage controller 125 selection module 310 will know that the available volume 210 is capable of being used by the virtual target volume apparatus 300. In a prophetic example, the identification module 325 may mark a first available volume 210a as virtual volume enabled if the first available volume 210a has volume size that is greater than or equal to the volume size of the primary volume 205.

In one embodiment, the copy module 330 creates a point-in-time copy of the primary volume 205 on the target volume as will be described hereafter. In a prophetic example, the copy module 330 may create the point-in-time copy by copying each data block of the primary volume 205 to the target volume before the data block is overwritten on the primary volume 205. The apparatus 300 allows the target volume with a physical attribute that is different from the primary volume physical attribute to be employed by a process such as a point-in-time copy process that requires the target volume to have the primary volume physical attribute.

Figure 4:
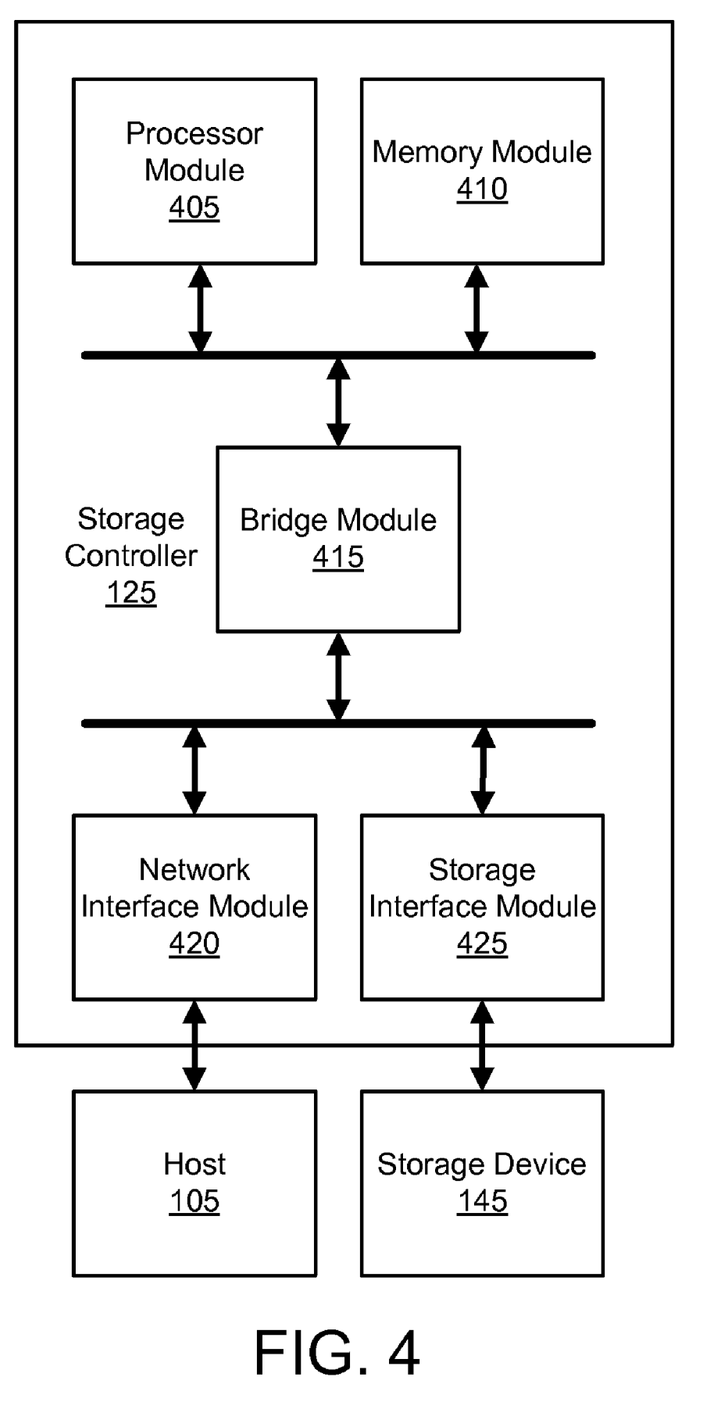
FIG. 4 is a schematic block diagram illustrating one embodiment of a storage controller of the present invention.

FIG. 4 is a schematic block diagram illustrating one embodiment of a storage controller 125 of the present invention. The controller 125 is the storage controller 125 of FIG. 1. In addition, the description of the storage controller 125 refers to elements of FIGS. 1-3, like numbers referring to like elements. The storage controller 125 includes a processor module 405, a memory module 410, a bridge module 415, a network interface module 420, and a storage interface module 425. In addition, the storage controller is depicted in communication with the host 105 and the storage device 145 of FIG. 1.

The processor module 405, memory module 410, bridge module 415, network interface module 420, and storage interface module 425 may be fabricated of semiconductor gates on one or more semiconductor substrates. Each semiconductor substrate may be packaged in one or more semiconductor devices mounted on circuit cards. Connections between the processor module 405, the memory module 410, the bridge module 415, the network interface module 420, and the storage interface module 425 may be through semiconductor metal layers, substrate to substrate wiring, circuit card traces, and/or wires connecting the semiconductor devices.

The memory module 410 stores software instructions and data. The processor module 405 executes the software instructions and manipulates the data as is well know to those skilled in the art. In one embodiment, the memory module 410 stores and the processor module 405 executes one or more software processes that embody the attribute module 305, selection module 310, presentation module 315, translation module 320, identification module 325, and copy module 330 of FIG. 3.

The processor module 405 communicates with the network interface module 420 and the storage interface module 425 through the bridge module 415. The network interface module 420 may be a token ring interface, an Ethernet interface, or the like. The Storage interface module 425 may be a Fibre Channel interface, a SCSI interface, or the like. In the depicted embodiment, the storage controller 125 communicates directly with the host 105. The storage controller 125 may also communicate with the host 105 through a storage server 115 and one or more networks 110, 120 as depicted in FIG. 1.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
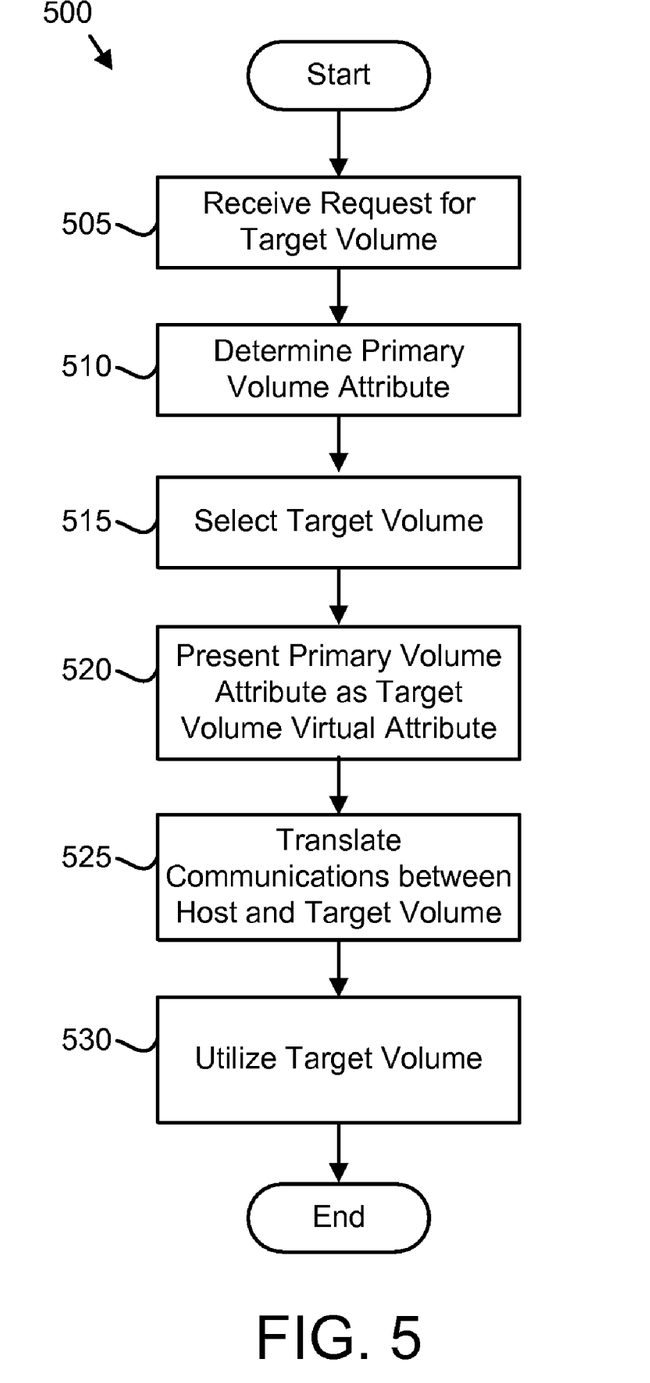
FIG. 5 is a schematic flow chart diagram illustrating one embodiment of a virtual storage presentation method of the present invention.

FIG. 5 is a schematic flow chart diagram illustrating one embodiment of a virtual storage presentation method 500 of the present invention. The method 500 substantially includes the steps to carry out the functions presented above with respect to the operation of the described apparatus 200, 300, 125 and system 100 of FIGS. 1-4. In addition, the description of the method 500 refers to elements of FIGS. 1-4, like numbers referring to like elements.

The method 500 begins and in one embodiment the storage controller 125 receives 505 a request from the host 105 for a target volume. The target volume may be requested for receiving a copy of the primary volume 205. In a certain embodiment, the request specifies the primary volume 205. Alternatively, the request may specify a physical attribute for the target volume.

The attribute module 305 determines 510 a primary volume physical attribute of the primary volume 205. The primary volume physical attribute may be a volume size, a data block size, a number of tracks per cylinder, a number of sectors per track, and a logical attribute. In one embodiment, the logical attribute is a model number, a model type, a configuration type, or the like. In addition, the attribute module 305 may determine 510 a plurality of primary volume physical attributes. In one embodiment, the attribute module 205 accesses configuration data for the primary volume 205 stored in the memory module 410 of the storage controller 125. In a prophetic example, the attribute module 205 may retrieve a volume size primary volume physical attribute from a data file stored in the memory module 410.

In an alternate embodiment, attribute module 305 queries the primary volume 205 for the primary volume physical attribute. In a prophetic example, the attribute module 205 queries the primary volume 205 for the number of sectors on the primary volume 205. In a certain embodiment, the attribute module 305 queries the host 105 for the primary volume physical attribute. In a prophetic example, the attribute module 305 may query the host 105 for the volume size of the primary volume 205. Alternatively, the attribute module 305 may determine 510 the primary volume physical attribute from the request received from the host 105. In a prophetic example, if the host 105 requests a one hundred gigabyte (100 GB) target volume, the attribute module 305 determines that the primary volume physical attribute is a one hundred gigabyte (100 GB) volume size.

In one embodiment, the selection module 310 selects 515 the target volume from the available volumes 210. In a certain embodiment, the selection module 310 selects 515 the target volume if the target volume is compatible with the primary volume physical attribute. In a prophetic example, if the primary volume physical attribute is a volume size of three hundred gigabytes (300 GB), the selection module 310 may select 515 the target volume with a volume size that exceeds three hundred gigabytes (300 GB).

In one embodiment, the identification module 325 marks one or more available volumes 210 as virtual volume enabled if the available volumes 210 conform to a specified physical attribute. The specified physical attribute may be the primary volume physical attribute. In a prophetic example, if the primary volume physical attribute is a one hundred gigabyte (100 GB) volume size, the identification module 325 may mark each available volume 210 with a volume size of one hundred gigabyte (100 GB) or greater as virtual volume enabled.

The identification module 325 may mark an available volume 210 as virtual volume enabled by writing a specified data string to a data array for the available volume 210 in the memory module 410 of the storage controller 125. In one embodiment, the selection module 310 selects 515 the target volume from the available volumes 210 marked as virtual volume enabled.

The presentation module 315 presents 520 the primary volume physical attribute to the host 105 as a target volume virtual attribute of the selected target volume. In one embodiment, the presentation module 315 presents 520 the primary volume physical attribute to the host 105 in response to the request from the host 105. The presentation module 315 may communicate the target volume virtual attribute as part of a data array. The data array may include an identifier for the target volume, one or more target volume virtual attributes of the target volume, and one or more physical attributes of the target volume.

The translation module 320 translates 525 communications between the host 105 and the target volume as will be described hereafter for FIG. 6. The storage controller 125 may include the translation module 320 and translate 525 communications between the host 105 and the target volume.

In one embodiment, the host 105 utilizes 530 the target volume. In a certain embodiment, the copy module 330 utilizes 530 the target volume by creating a point-in-time copy of the primary volume 205 on the target volume. In an alternate embodiment, the host 105 may utilize the target volume in place of the primary volume 205. In a prophetic example, the target volume may store a copy of the primary volume 205. If the primary volume 205 fails, the host 105 may access the target volume in place of the primary volume 205. The method 500 allows target volumes with various physical attributes to be used with the primary volume 205 in supporting the host 105.

Figure 6:
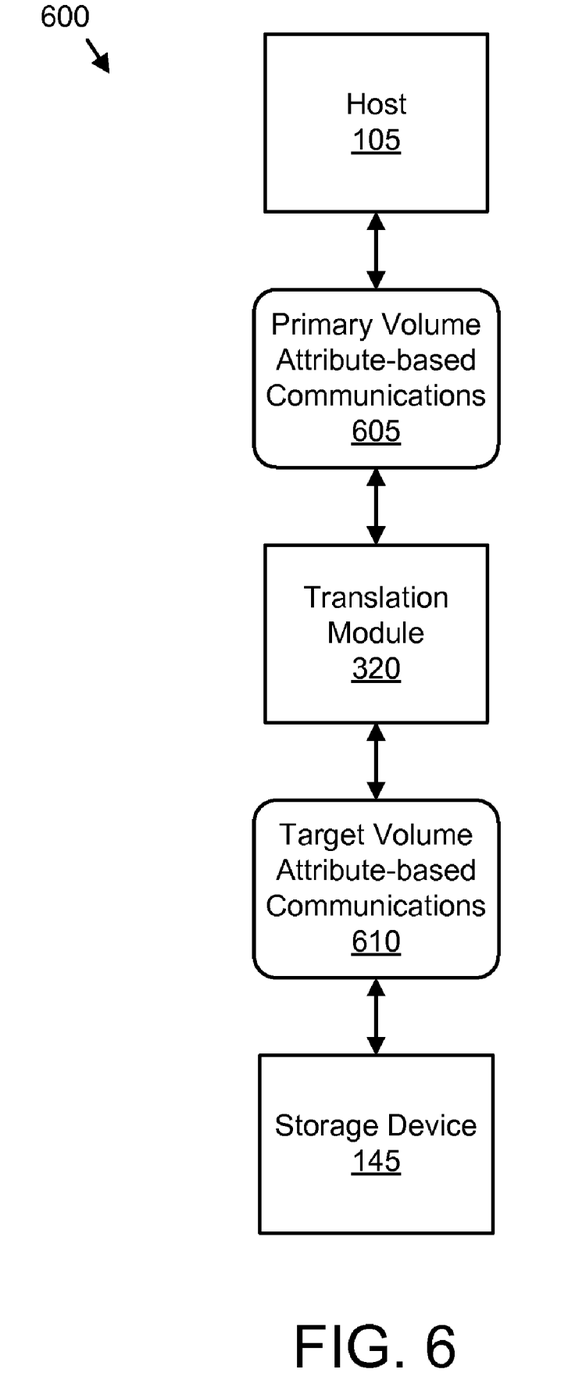
FIG. 6 is a schematic flow chart diagram illustrating one embodiment of a translation process in accordance with the present invention.

FIG. 6 is a schematic flow chart diagram illustrating one embodiment of a translation process 600 in accordance with the present invention. The process 600 may embody step 525 of FIG. 5. The description of the process refers to elements of FIGS. 1-5, like numbers referring to like elements.

The host 105 is depicted exchanging communications with the translation module 320. The translation module 320 may be a software process executing on the processor module 405 of the storage controller 125. Although for simplicity the host 105 is shown communicating directly with the translation module 320, the host 105 may communicate with the translation module 320 through one or more intermediary devices such as the network 110, storage server 115, and storage network 120 of FIG. 1.

The translation module 320 is depicted exchanging communications with a storage device 145. The storage device 145 may include one or more physical volumes such as the primary volume 205 and the available volumes 210, wherein a target volume is selected 515 from the available volumes 210. In one embodiment, the translation module 320 exchanges communications with a plurality of storage devices 145.

Communications between the host 105 and the translation module 320 are primary volume physical attribute-based communications 605. In a prophetic example, the primary volume physical attribute, which is also the target volume virtual attribute, may be a one hundred gigabyte (100 GB) volume size. Communications 605 from the host 105 to the translation module 320 utilize and are based on the one hundred gigabyte (100 GB) size. Thus, if the host 105 copies fifty gigabytes (50 GB) of data to the target volume and queries the unused capacity of the target volume, the translation module 320 may reply to the host 105 that fifty gigabytes (50 GB) are available although the target volume may be have a two hundred gigabyte (200 GB) volume size with one hundred and fifty gigabytes (150 GB) of available storage.

Communications between the translation module 320 and the storage device 145 are target volume physical attribute-base communications 610. In a prophetic example, the host 105 may communicate data to the translation module using communications based on a forty-eight kilobyte (48 KB)

track size. The translation module 320 may communicate the data to the storage device using target volume physical attribute-based communications 610 that are based on a fifty-six kilobyte (56 KB) track sizes.

In addition, the storage device 145 may communicate data formatted in fifty-six kilobyte (56 KB) track sizes to the translation module 320. The translation module 320 may communicate the data formatted in forty-eight kilobyte (48 KB) track sizes to the host 320. Thus the host 105 may utilize a target volume embodied in the storage device 145 as thought the target volume had the primary volume physical attribute.

Figure 7:
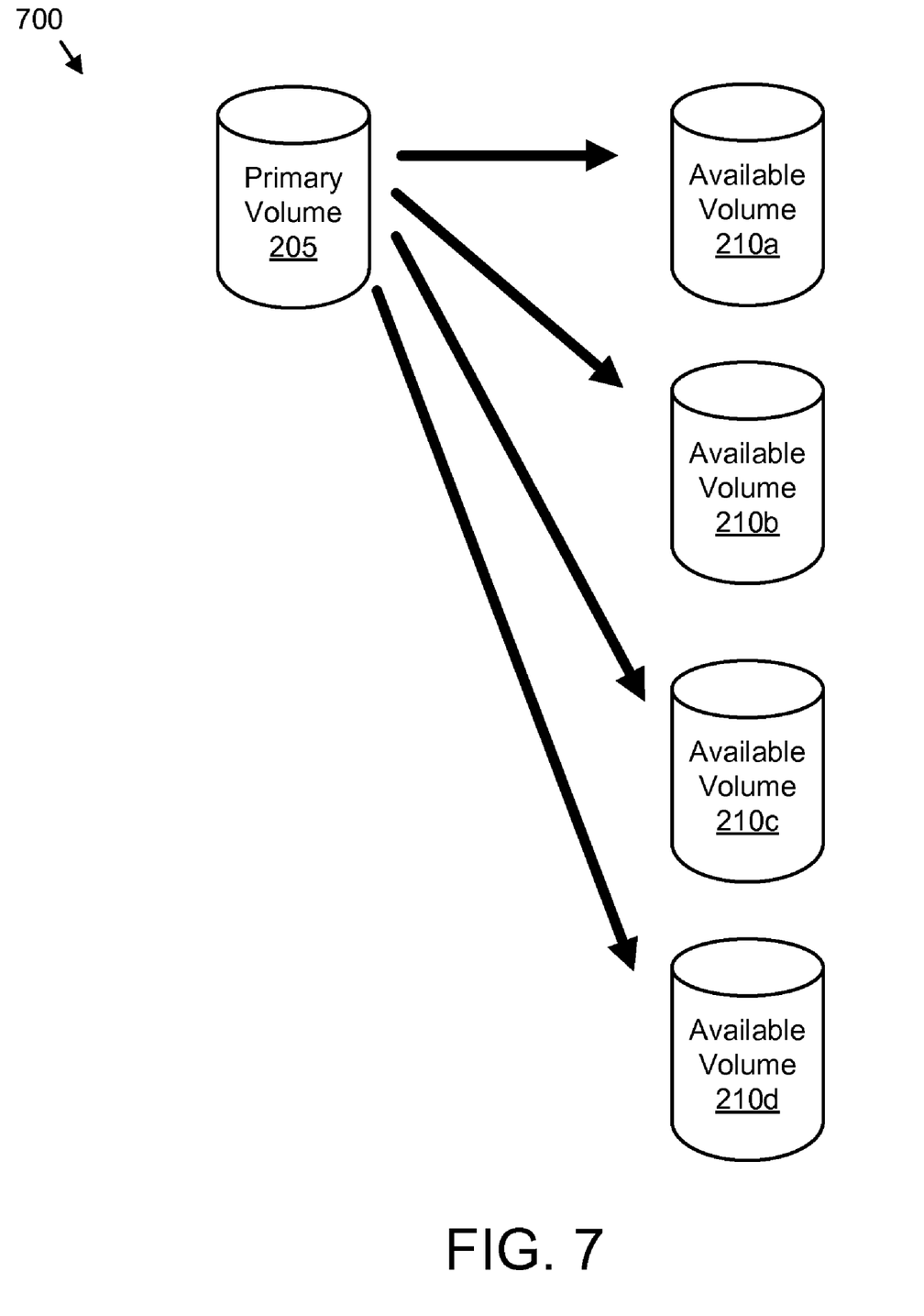
FIG. 7 is a schematic block diagram illustrating one embodiment of virtual data volumes of the present invention.

FIG. 7 is a schematic block diagram illustrating one embodiment of virtual data volumes 700 of the present invention. The available volumes 200 of FIG. 2 are depicted as virtual volume 700. The description of FIG. 7 refers to elements of FIGS. 1-6, like numbers referring to like elements.

Continuing the prophetic example of FIG. 2, the presentation module 315 may present 520 each of the available volumes 210 as having the primary volume physical attribute of the volume size of the primary volume 205 to the host 105. Thus the host 105 may utilize any of the available volumes 210 as a target volume. For example, the host 105 may utilize a third available volume 210c as the target volume, although the volume size of the third available volume 210c is greater than the volume size of the primary volume 205. Thus, the storage subsystem 130 may employ physical volumes with a plurality of physical attributes.

The embodiment of the present invention presents a primary volume physical attribute as a target volume virtual attribute to a host 105, allowing the host 105 to utilize a target volume as though the target volume had the primary volume physical attribute. In addition, the embodiment of the present invention may support employing the target volume for a point-in-time copy of the primary volume 205 where the host 105 requires a physically equivalent target volume.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to present a virtual volume, the apparatus comprising:
   an attribute module comprising executable code stored on a storage device, executed by a processor, and configured to determine a primary volume physical attribute of a primary volume; and
   a presentation module comprising executable code stored on a storage device, executed by a processor, and configured to present the primary volume physical attribute to a host as a target volume virtual attribute of a target volume, the host configured to employ an available volume having an attribute equivalent to primary volume physical attribute of the primary volume such that the target volume virtual attribute presented to host enables the host to employ the target volume for a process requiring an equivalent attribute.

2. The apparatus of claim 1, further comprising a translation module comprising executable code stored on a storage device, executed by a processor, and configured to translate communications between the host and the target volume such that communications to and from the host are based on the target volume virtual attribute and communications to and from the target volume are based on a target volume physical attribute.

3. The apparatus of claim 2, wherein the translation module is further configured to present the target volume to the host as the primary volume.

4. The apparatus of claim 2, further comprising a selection module comprising executable code stored on a storage device, executed by a processor, and configured to select the target volume in response to the primary volume physical attribute, wherein the target volume physical attribute of the selected target volume is compatible with the primary volume physical attribute.

5. The apparatus of claim 1, further comprising an identification module comprising executable code stored on a storage device, executed by a processor, and configured to mark the target volume as virtual volume enabled in response to the target volume conforming to a specified physical attribute.

6. The apparatus of claim 1, further comprising a copy module comprising executable code stored on a storage device, executed by a processor, and configured to create a point-in-time copy of the primary volume on the target volume.

7. The apparatus of claim 1, wherein the primary volume physical attribute is configured as a volume size.

8. The apparatus of claim 1, wherein the primary volume physical attribute is selected from a data block size, a number of tracks per cylinder, a number of sectors per track, and a logical attribute.

9. A computer program product comprising a computer useable medium having a computer readable program, wherein the computer readable program when executed on a computer causes the computer to:
   determine a primary volume physical attribute;
   present the primary volume physical attribute to a host as a target volume virtual attribute of a target volume the host configured to employ an available volume having an attribute equivalent to primary volume physical attribute of the primary volume such that the target volume virtual attribute presented to host enables the host to employ the target volume for a process requiring an equivalent attribute; and
   translate communications between the host and the target volume such that communications to and from the host are based on the target volume virtual attribute and communications to and from the target volume are based on a target volume physical attribute.

10. The computer program product of claim 9, wherein the target volume is marked as virtual volume enabled in response to the target volume conforming to a specified physical attribute.

11. The computer program product of claim 9, wherein the computer readable program is further configured to cause the computer to select the target volume in response to the primary volume physical attribute.

12. The computer program product of claim 11, wherein the target volume physical attribute of the selected target volume is compatible with the primary volume physical attribute.

13. The computer program product of claim 12, wherein the computer readable program is further configured to cause the computer to create a point-in-time copy of the primary volume on the target volume.

14. The computer program product of claim 9, wherein the primary volume physical attribute is selected from a volume size, a data block size, a number of tracks per cylinder, a number of sectors per track, and a logical attribute.

15. A system to present a virtual volume, the system comprising:
- a primary volume configured to store data and comprising a primary volume physical attribute;
- a target volume configured to store data;
- a storage controller configured to manage the primary volume and the target volume and comprising;
  - an attribute module configured to determine the primary volume physical attribute of the primary volume;
  - a selection module configured to select the target volume from a plurality of available volumes in response to the primary volume attribute, wherein a target volume physical attribute of the selected target volume is compatible with the primary volume physical attribute;
  - a presentation module configured to present the primary volume physical attribute to a host as a target volume virtual attribute of the selected target volume, the host configured to employ an available volume having an attribute equivalent to primary volume physical attribute of the primary volume such that the target volume virtual attribute presented to host enables the host to employ the target volume for a process requiring an equivalent attribute; and
  - a translation module configured to translate communications between the host and the selected target volume such that communications to and from the host are based on the target volume virtual attribute and communications to and from the selected target volume are based on a target volume physical attribute.

16. The system of claim 15, wherein the storage controller further comprises a copy module configured to create a point-in-time copy of the primary volume on the target volume.

17. The system of claim 15, wherein the translation module is further configured to present the target volume to the host as the primary volume.

18. The system of claim 15, wherein the storage controller further comprises an identification module configured to mark the target volume as virtual volume enabled in response to the target volume conforming to an attribute selected from a volume size, a data block size, a number of tracks per cylinder, a number of sectors per track, and a logical attribute.

19. A method for deploying computer infrastructure, comprising integrating computer-readable code into a computing system, wherein the code in combination with the computing system is capable of performing the following:
- determining a primary volume physical attribute selected from a volume size, a data block size, a number of tracks per cylinder, and a number of sectors per track;
- selecting a target volume in response to the primary volume physical attribute;
- presenting the primary volume physical attribute to a host as a target volume virtual attribute of the target volume, the host configured to employ an available volume having an attribute equivalent to primary volume physical attribute of the primary volume such that the target volume virtual attribute presented to host enables the host to employ the target volume for a process requiring an equivalent physical attribute;
- translating communications between the host and the target volume such that communications to and from the host are based on the target volume virtual attribute and communications to and from the target volume are based on a target volume physical attribute; and
- creating a point-in-time copy of the primary volume on the target volume.

20. The method of claim 19, wherein the method comprises presenting the target volume to the host as the primary volume.

* * * * *